United States Patent [19]

Brown

[11] 4,125,350
[45] Nov. 14, 1978

[54] MECHANICAL DIE ADJUSTMENT MECHANISM

[75] Inventor: Gaylord W. Brown, Beaverton, Mich.

[73] Assignee: Sweetheart Plastic, Inc., Beaverton, Mich.

[21] Appl. No.: 677,974

[22] Filed: Apr. 19, 1976

[51] Int. Cl.² .............................................. B29F 3/04
[52] U.S. Cl. ...................................... 425/381; 74/132; 74/471 R; 425/141; 425/466
[58] Field of Search ............ 425/309, 466, 381, 133.5, 425/141; 264/176 R; 74/471 R, 129, 132, 422

[56] References Cited

U.S. PATENT DOCUMENTS

| | | | |
|---|---|---|---|
| 2,334,684 | 11/1943 | Zappia | 74/132 UX |
| 3,181,565 | 5/1965 | Haskins | 74/471 X |
| 3,830,610 | 8/1974 | Ohkawa et al. | 425/381 X |
| 3,850,568 | 11/1974 | Bartha et al. | 425/381 X |
| 3,884,611 | 5/1975 | Anderson et al. | 425/466 X |
| 3,969,053 | 7/1976 | Baconnier et al. | 425/309 X |

Primary Examiner—Francis S. Husar
Assistant Examiner—Mark Rosenbaum

[57] ABSTRACT

Apparatus for adjusting the rotary position of any selected one of a plurality of rotatable die bolts to control the position of a die lip and the size of a die opening adjacent the die lip comprising a reciprocable drive member movable in a to-and-fro path of travel and a plurality of bolt actuating members mounted on the drive member for movement therewith and for movement relative thereto between positions removed from the bolts and bolt drive positions in driving relation with any selected one of the bolts.

29 Claims, 5 Drawing Figures

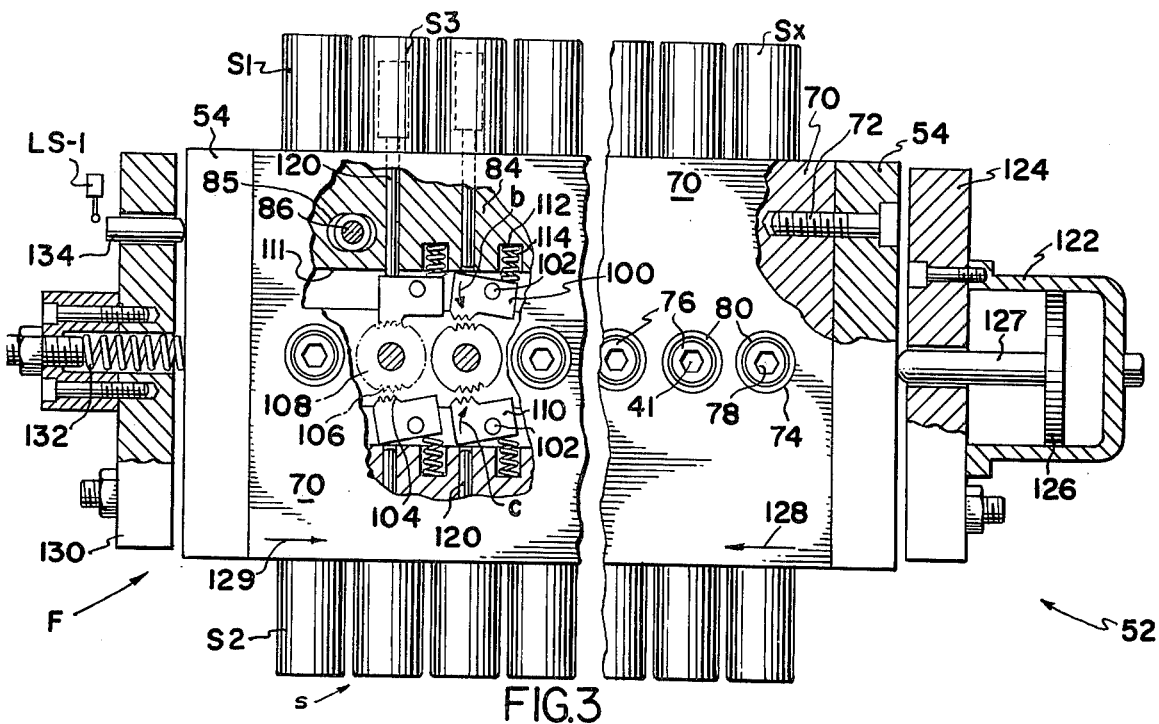
FIG.3
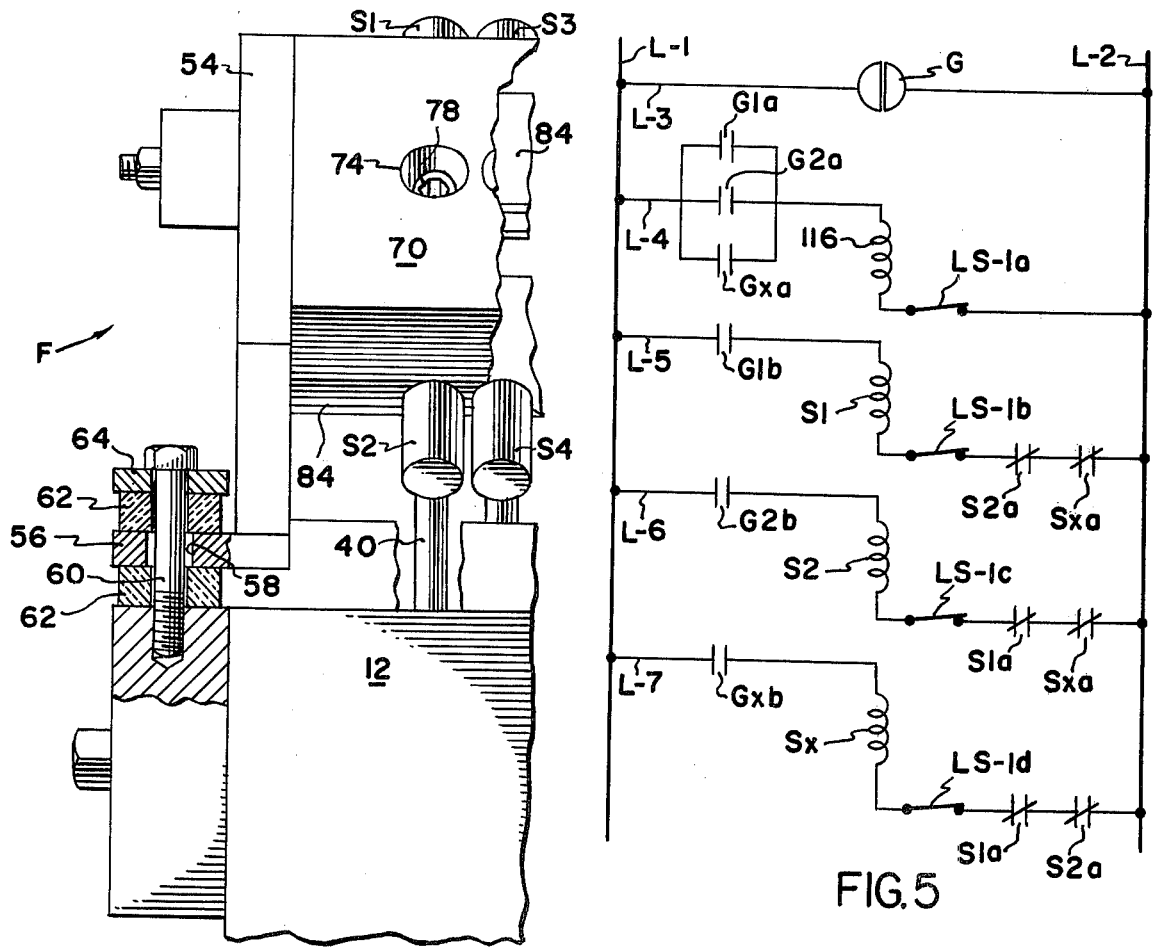
FIG.4
FIG.5

MECHANICAL DIE ADJUSTMENT MECHANISM

BACKGROUND OF THE INVENTION

This invention relates to apparatus for controlling the thickness of a sheet extruded by a sheeting die and more particularly to die adjustment mechanism for mechanically adjusting the position of any selected one of a plurality of die bolts which adjust the position of a die lip and the size of a die opening.

Sheets of plastic, such as that formed from styrene resins, have been previously extruded via a sheeting die including a die body having an elongate opening therein. The die body includes generally parallel, coextensive extruding lips defining the elongate die opening or slot through which the plastic is extruded to form the sheet. One of the lips is integrally, flexibly connected to the remainder of the die body via a relatively thin web and can be adjustably positioned to control the size of the die opening and thereby control the thickness of the sheet being extruded. A plurality of die lip adjusting bolts are longitudinally spaced along the die body and bear against longitudinally spaced portions of the lip. The rotary positions of the bolts can be controlled by rotating the bolts about their axes to control the positions of longitudinally spaced portions of the lip.

In one sheeting die, the temperature of an exposed portion of each bolt is controlled by an individual heater which changes the length of the bolt as required to change the lip opening. As the bolt expands and contracts, it adjusts the position of a flexible die lip and controls the thickness of the plastic sheet extruded via the sheeting die. The heated bolt concept requires not only a control signal to change the dimension of the bolt but also requires continued maintenance of a given signal to maintain the adjustment. Such a system is relatively sophisticated and difficult to maintain.

Accordingly, it is an object of the present invention to provide new and improved apparatus for controlling the thickness of a sheet continuously derived from a machine.

It is another object of the present invention to provide an adjustment mechanism for a sheeting die of the type described which will mechanically adjust the positions of the die bolts.

It is yet another object of the present invention to provide a mechanical die adjusting mechanism of the type described which will respond to a signal to rotate the bolts and change the position of the die bolts and which will maintain the bolts in the adjusted positions without a continuous control signal from the control system.

It is a further object of the present invention to provide die bolt adjusting mechanism including a carriage which moves in a to-and-fro path of travel and includes mechanism for selectively adjusting any one of a plurality of rotatable die bolts.

A still further object of the present invention is to provide die bolt adjusting mechanism including a reciprocable carriage mounting a plurality of die bolt actuating members movable between a removed position and a position engaging selected one of said bolts and mechanism for selectively operating any selected one of the actuable means to selectively adjust the position of any bolt.

A further object of the present invention is to provide apparatus for mounting the die adjusting mechanism on a sheeting die while permitting expansion of the die relative to the adjusting mechanism.

Other objects and advantages of the present invention will become apparent to those of ordinary skill in the art as the description thereof proceeds.

SUMMARY OF THE INVENTION

Apparatus for mechanically adjusting the rotary positions of a plurality of rotatable die bolts to adjust the position of a flexible die lip and control the size of a die opening adjacent the lip comprising a drive member movable in a to-and-fro path of travel and mechanism mounted on the drive member for movement therewith and for movement relative thereto for selectively rotating any selected one of the die bolts as the drive member moves in the to-and-fro path of travel.

The present invention may more readily be understood by reference to the accompanying drawings in which:

FIG. 3 is an enlarged top plan view of the die taken along the line 3—3 of FIG. 2, parts being broken away to more clearly illustrate the underlying parts;

FIG. 4 is an enlarged side elevational view, parts broken away in section, taken along the line 4—4 of FIG. 2; and FIG. 5 is a schematic diagram of an electrical control circuit for controlling the operation of the apparatus illustrated in FIGS. 1-5.

DESCRIPTION OF THE PREFERRED EMBODIMENT

Figure 1:
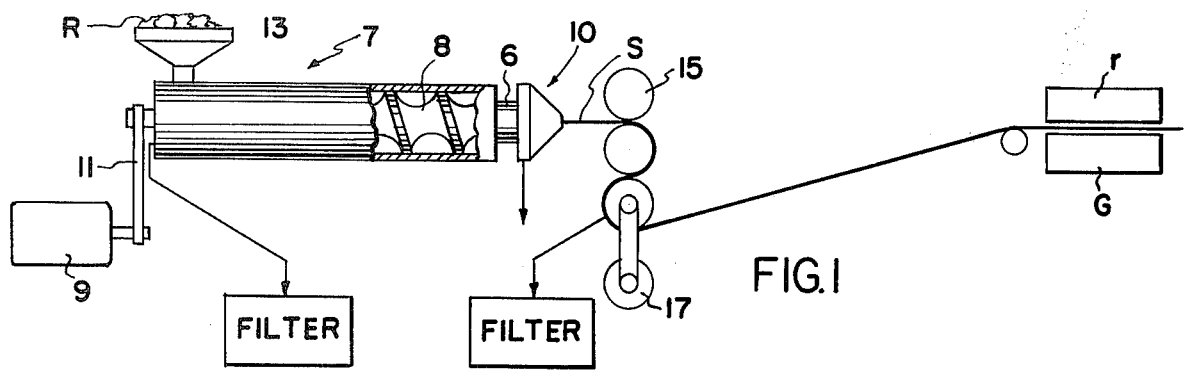
FIG. 1 is a schematic diagram of a system for continuously deriving a sheet incorporating apparatus constructed according to the present invention.
Figure 2:
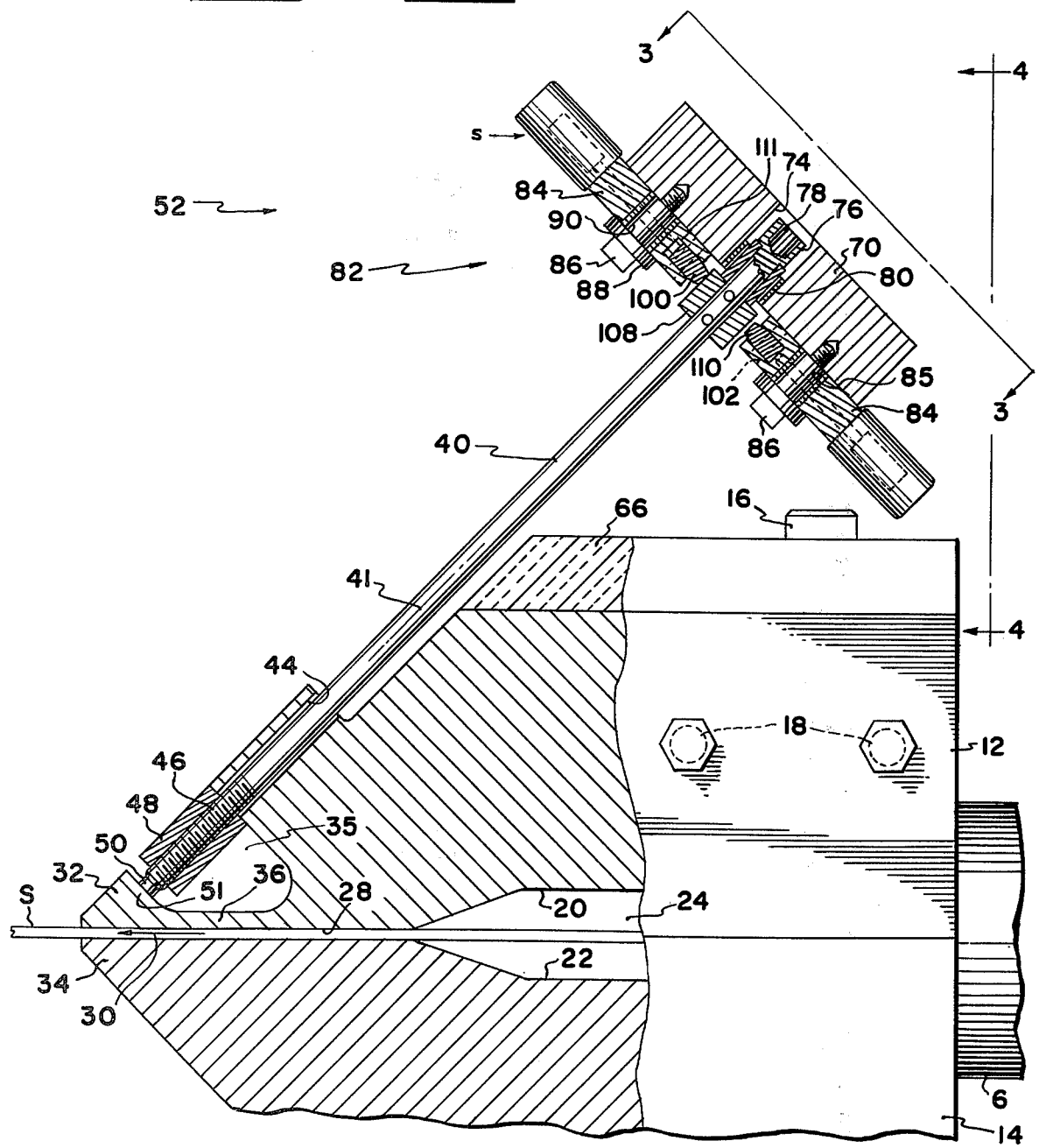
FIG. 2 is an enlarged sectional side view illustrating mechanical die adjusting mechanism mounted on the sheeting die illustrated in FIG. 1.

Apparatus constructed according to the present invention is particularly adapted for use with a sheeting die generally designated 10. The sheeting die 10 is coupled to the outlet 6 of a plastic sheet extruder machine 7 of the type disclosed in U.S. Pat. No. 3,015,129 including a rotatable extrusion screw 8 driven via an electric motor 9 and drive belt 11. Raw plastic material, such as styrene resin R fed to the screw 8 via a supply hopper 13, is extruded via the sheeting die 10 in the form of a thin sheet S which is fed to a plurality of chill rolls 15 driven by a variable speed electric motor 17. The rotational velocity of rolls 15 is controlled by the motor 17 to control the throughput of the machine as more particularly described in U.S. Pat. No. 3,904,338 which is incorporated herein by reference.

Apparatus is provided for measuring the thickness of a sheet S and includes a radiation source $r$ mounted on the upper side of the Sheet S. The sheet thickness is measured by a noncontacting, scanning guage G positioned downstream of rolls 15 at a point where the sheet S has been cooled sufficiently to be set and not deformable in response to being pulled as described in the referenced U.S. Pat. No. 3,904,338. The guage G incorporates a radiation detector for detecting the level of radiation which is emitted by the penetrating radiation source $r$ and which penetrates the sheet S as more particularly described in the referenced U.S. Pat. No. 3,904,338.

U.S. Pat. No. 3,940,221, incorporated herein by reference, discloses beta ray scanning apparatus which would also be suitable.

The sheeting die 10 is of the type disclosed in the referenced U.S. Pat. No. 3,940,221 and includes upper and lower die bodies 12 and 14 coupled together by connecting rods 16. Cartridge heaters 18 are disposed in the die body for maintaining the sheeting die 10 at a predetermined temperature. The upper and lower die bodies 12 and 14 include confronting slots 20 and 22 cooperating to define an elongate passage or opening 24 for receiving extruded styrene resin from the outlet 6 of the extruder 7. The upper and lower die bodies 10 and 12 include elongate, confronting die lips 32 and 34 defining a necked down slot portion or die opening 28 through which the plastic sheet S is received from the die passage 24, spread, and extruded in the direction of the arrow 30. Upper die body 12 includes an external recess 35 extending the length of the die body 10. The upper die lip 32 is integrally connected to the remainder of the die body 12 via a thin web 36, adjacent the recess 35, which permits the die lip 32 to flex from its position illustrated in FIG. 1, toward the opposing die lip 34 to adjust the thickness of the sheet S being extruded.

The die lips 32 and 34 and the size of the die opening 28 is controlled via a plurality of longitudinally spaced, rotatable die bolts 40 received in passages 44 provided in the upper die body 12. The die bolts 40 have threaded ends 46 threadily received in sleeves 48 which are disposed in the die recess 35 and are suitably fixed to the upper die body 12. Each die bolt 40 includes a terminal end 50 which bears against a portion 51 of the upper die lip 32 to adjustably position of the lip portion 51 which it engages.

Apparatus, generally designated 52, constructed according to the present invention is provided for trimming the die by mechanically adjusting the rotary position of the die bolts 40 to adjust and control the sheet profile. The die bolt adjusting mechanism 52 includes a frame, generally designated F, having a pair of upstanding end frame members 54 provided at the lower ends with transverse flanges 56 mounted on the upper die body 12. The outwardly extending flange members 56 have elongate apertures 58 therein for a purpose to become immediately apparent. Strips of low friction TEFLON or similar material 62 are disposed on upper and lower sides of the mounting flanges 56 and mounting straps 64 overlie the upper TEFLON layers 62. The mounting flanges 56 are clamped to the die body 12 via a plurality of bolts 60 which are received in the oversized, elongate openings 58. The openings 58 permit expansion of the die body 12 relative to the adjusting apparatus 52.

If styrene resins R are to be extruded, the temperature of the sheeting die 10 is maintained at approximately 425° F. The temperature of the adjusting mechanism is maintained at a temperature not greater than 150° F. for a purpose to be described hereinafter. Insulation, generally designated 66, must be disposed between the die body 12 and the adjusting mechanism 52 to maintain this temperature differential.

The frame F includes an elongate mounting block, generally designated 70, coupled to the end frame members 54 via bolts 72. The elongate block member 70 includes a plurality of vertical bores 74 therethrough which receive the upper ends 76 of the bolts 40. The upper ends 76 of the bolts, which are journalled in the block member 70 via needle bearings 80, include hexagonal receptacles 78 adapted to receive a complementally shaped wrench. The bolts 40 can thus be manually rotated about their longitudinal axis 41 by the hexagonal wrench.

Die bolt drive mechanism, generally designated 82, is mounted on the underside of the block 70 and includes a pair of rectangular solid slides 84 slidably coupled to the block 70 via bolts 86 and retaining plates 88. The slides 84 include elongated die bolt receiving openings 85 mounted on needle bearings 90 which journal the bolts 86 to permit the slides 84 to reciprocate in a to-and-fro longitudinal path represented by the arrows 128, 129 (FIG. 3) relative to the block 70.

The die bolt drive mechanism 82 includes a plurality of longitudinally spaced pairs of opposed pawls 110, and 100 pivotally mounted on the slides 84 for pivotal movement about pins 102 from the inoperative positions illustrated in solid lines in FIG. 3, removed from the die bolts 40 and operative bolt driving positions illustrated in chain lines in FIG. 3. The pawls 100 and 110 include teeth 104 which engage cooperating teeth 106 provided on ratchet wheels 108 fixed to the upper ends of the die bolts 40. The opposed pawls 100, 110 are received in slotted openings 111 provided along the upper, inner surfaces of the slides 84. The openings 111 are countersunk at 112 and receive biasing springs 114 which bear against the pawls 100 to yieldably urge them to be retracted, inoperative positions illustrated in FIG. 3.

As is illustrated in FIG. 3, a pair of pawls 100 and 110 is associated with each die bolt 40. One of the pawls 100 on one side of each die bolt 40 will swing in the direction of the arrow *b* as it moves to the operative position whereas the pawl 110 on the opposite side will swing in the opposite direction, represented by the arrow *c*, as it moves to its operative position. As will be described more fully hereinafter, only one pawl of the plurality of pairs of pawls 100 and 110 will move to the operative position to engage the associated ratchet wheel 108 as the slides 84 move in the to-and-fro path of travel represented by the arrows 128 and 129.

Apparatus is provided for selectively moving any selected one of the pawls 100 and 110 into driving engagement with a selected die bolt 40 as the slides 84 move in the direction of the arrow 128 and includes a plurality of electrically operated solenoids, generally designated *s* and more specifically designated S1, S2, S3, S*x*, etc. including plungers 120 which engage the pawls 100, 110 for moving them to the operative, bolt driving positions illustrated in chain lines. As the drive member or slides 84 move in a to-and-fro path, one of the solenoids S1, S2, S*x* will be energized to move the associated plunger 120 and thus move the selected pawl 100, 110 associated therewith into a position in which the pawl teeth 103 and ratchet wheel teeth 106 engage to rotate the die bolt 40 about its axis 41. As will be described more fully hereinafter, the solenoid, *s*, which is energized as the slide 84 moves forwardly, is deenergized when the slides 84 reach the end of their forward path of travel, represented by the arrow 128. The selected pawl 100, 110, is then returned to the inoperative position, via the spring 114 so as not to rotate the die bolt 40 as the slides 84 return in the opposite path of travel represented by the arrow 129. The pawls 100, 110 thus function as a lost motion connection which only drive the die bolts 40 as the slides 84 move in the direction of the arrow 128 and not when the slides 84 move in the opposite direction represented by the arrow 129.

Apparatus is provided for reciprocating the slides or drive members 84 in a to-and-fro path of travel, represented by the arrows 128 and 129, and includes a fluid pressure operated, solenoid actuated cylinder 122 mounted on upstanding frame member 124 fixed to the upper die body 12. A piston 126 is received in the cylinder 122 and includes a drive plunger 127 which bears against one of the end frame members 54 for urging the slides 84 forwardly in the direction of the arrow 127 as an advance solenoid 116 (FIG. 5) is energized to direct fluid to the cylinder 122 so that the plunger moves forwardly in the direction of the arrow 128.

Mounted at the opposite end of the adjusting mechanism, on an upstanding frame member 130 fixed to the die body 12, is a compression spring 132 which will return the slides or drive members 84 in the opposite direction, represented by the arrow 129, when the solenoid 116 (FIG. 5) is deenergized to interrupt fluid pressure to the cylinder 122.

Fluid pressure to the cylinder 122 is interrupted via a limit switch LS-1 tripped by a plunger 134 which is slidably mounted on frame member 30. The plunger 134 is disposed in the path of the slides 84 so as to be engaged as the slide thereby reaches the end of its forward stroke. The limit switch LS-1 includes a pair of normally closed limit switch contacts LS-1a (FIG. 5) which will open to deenergize the solenoid S-1 whereby the slides 84 will be returned in the direction of the arrow 129 to the starting positions via the return spring 132. The limit switch LS-1 includes normally closed limit switch contacts LS-1b, LS-1c, and LS-1d which open when the limit switch LS-1 is tripped.

The Circuit

Referring now to FIG. 5, an electrical circuit is schematically illustrated for operating the apparatus illustrated in FIGS. 1-4 and includes a pair of input lines L-1 and L-2 having a plurality of parallelly connected sub-circuit lines L-3 through L-7.

Connected in Line L-3 is the thickness guage, schematically designated G. The thickness guage G continuously scans the sheet S to determine the quantity of beta rays being emitted by the radiation source $r$ which penetrate the sheet S. The guage G provides a continuous, digital instantaneous or average readout and an accompanying signal is provided to the solenoid 116 and selected ones of the solenoids S1, S2 and Sx. The continuous sheet thickness profile is translated into a signal by the guage G and coupled to the appropriate one of the solenoids S1, S2, etc. The thickness guage G includes normal opened contacts G1a, G2a, Gxa and normal opened contacts G1b, G2b, GXb which close depending upon the output of the guage apparatus G.

The guage contacts G1a, G2a, and Gxa are all connected in parallel circuit in line L4. The parallelly connected contacts G1a, G2a and Gxa are connected in series circuit with the normally closed limit switch contacts LS-1a (line L-3) and the solenoid 116 which when energized directs fluid to the cylinder 122 to forwardly advance the slides 84 in the direction of the arrow 128.

Connected in series in circuit line L-5 are the normally open thickness guage contacts G1b, the solenoid S1 for moving one of the pawls 100 to the operative position, the normally closed limit switch contacts LS-1b, and the normally closed contacts S2a and Sxa, which are opened when the solenoids S2 and Sx (lines L-6 and L-7), respectively, are energized.

Line L6 includes the normally open guage contacts G2b which are closed when the thickness guage G senses that the solenoid S2 is to be energized. The normally open contacts G2b are connected in circuit with the solenoid S2 for advancing the oppositely disposed plunger 120 associated with the first die bolt 40. Also connected in line L6 are normally closed contacts limit switch contacts LS-1c and the normally closed solenoid contacts S1a and SXa which are opened when the solenoids S1 and Sx respectively are energized.

Connected in line L7 are normally open contacts GXb which are closed when the thickness guage determines that the solenoid Sx is to be energized. Also connected in line L7 are the normally closed limit switch contacts LS-1d and the solenoid Sx for forwardly advancing the plunger 120 associated with the solenoid Sx. Also connected in series circuit L7 are the normally closed contacts S1a and S2a which opened when the solenoids S1 and S2 respectively are energized.

The pressure of the fluid supplied to the cylinder 122 is limited such that the power for advancing the slides 84 is a maximum of twice that normally required to rotate one of the bolts 40. For example, if 50 inch pounds of torque is normally required to rotate one of the bolts 40, only enough fluid pressure is applied to the cylinder 122 such that a maximum of 100 inch pounds can be applied to the bolt. In this way, if the bolt is "frozen" the power applied by cylinder 122 to the slides 84 will not be sufficient to break the bolt to be rotated. If one of the bolts 40 can not be turned when engaged by a forwardly moving pawl 100, the limit switch LS-1 will not be actuated and the system will be rendered inoperative. If the limit switch LS-1 is actuated, it indicates that the system is operating properly and will return the slides to their starting position.

An inter-lock system included with guage G permits only one of the bolts 40 to be engaged by one of the pawls 100, 110 at any given time.

The Operation

During the initial start-up, the operator inserts a hexagonal wrench into the opening 78 at the upper ends of the die bolts 40 to manually adjust the die bolts 40 and initially make the gross adjustment of the flexible die lip 32. The automatic gap adjustment range is usually about 0.004 inches or plus or minus 0.002 inches. The die is initially brought within this range manually and the system is then switched to an automatic mode.

As the guaging apparatus G scans the sheet, the variations in the sheet thickness will be determined. If for example, the sheet thickness is guaged to be less than desired, the thickness guage G will operate to close the contacts G1a (Line L4) and G1b (Line L5) (FIG. 5) to energize the advance solenoid 116 whereby fluid pressure will be admitted to the slide advance cylinder 122 and the slides or drive members 84 will be driven forwardly in the direction of the arrow 128. At this same time, the contacts G1b will close to energize the pawl advance solenoid S1 to advance the plunger 120 associated therewith and move the associated pawl 100 in the direction of the arrow $b$ into engagement with the ratchet wheel 108 mounted on the associated die bolt 40. The die bolt 40 will thus turn about its axis 41 and will move a portion of the flexible die lip 32 closer to the die lip 40.

As the slide or drive member 84 reaches the end of its forward path, the opposite end plate 54 will engage the limit switch actuator 134 which will open the limit switch contacts LS-1a and deenergize the solenoid winding 116. Fluid pressure to the cylinder 122 will thus be interrupted and the spring 132 will force the slides or drive members 84 in the opposite direction represented by the arrow 129 to the start position. When the limit switch LS-1 is tripped, the limit switch contacts LS-1b (Line L-5) also open to interrupt current to the solenoid winding S1 and the plunger 118 is retracted to the outermost position and the associated pawl 100, is swung in the opposite direction to its initial position via the return spring 114. The bolt 40 is not driven in the opposite direction when the slides 84 return to their starting position in the direction represented by the arrow 129. If the bolt 40 has not been rotated sufficient to correct the size of the die opening, the slides 84 will again be driven in the direction of the arrow 128 and the operation will be repeated periodically until the flexible die lip 32 is properly positioned.

If the guage G indicates that other portions of the sheet S are too thick, an appropriate signal will be coupled to the appropriate solenoid SX to move the appropriate pawl 100, into engagement with the associated bolt 40. Only one bolt 40 is driven at any one time. The slides 84 will continue to move to-and-fro until all bolts are properly adjusted.

If, for example, the sheet thickness is too thin, the guage G will close the contacts G2a so that the winding 116 (Line L4) is again energized and the slides 84 are moved forwardly. At the same time the thickness guage G will provide a signal to close the contacts G2b and energize the solenoid S2. This will drive the oppositely disposed plunger 120 associated with the pawl 100 to swing it in the direction of the arrow c into engagement with the associated pawl 110. This will rotate the die adjusting bolt 40 in the opposite direction represented by the arrow b.

As the slides 84 reach the end of their forward path of travel, the limit switch LS-1 is again tripped to open limit switch contacts LS-1a and LS-1c and deenergize solenoid winding S2. Fluid pressure to cylinder 122 is then interrupted and the spring 132 forces the slides 84 to their starting positions. The operation will be repeated periodically until the adjustment is completed.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. A sheet die comprising:
   a die body having a pair of opposed, longitudinally extending die lips defining an elongate die opening through which plastic and the like is extruded in sheet form, one of said die lips being movable toward and away from the other of said die lips to adjust the size of said opening;
   means operatively associated with said die body, for adjusting the position of said one die lip including rotatable die bolt means on said die body for moving at least a portion of said one die lip toward and away from said other die lip; and
   die bolt drive means, operatively associated with said die bolt means, movable in a longitudinal to-and-fro path of travel, for selectively rotating said die bolt means in either direction of rotation about the rotational axis of said die bolt means, as said die bolt drive means moves in said to-and-fro path.

2. The die as set forth in claim 1 wherein said die bolt drive means includes die bolt actuating means movable between a position removed from said bolt means and a bolt driving position, in which it will drivingly rotate said die bolt means as said drive means moves in said to-and-fro path.

3. The die set forth in claim 2 wherein said bolt drive means comprises plunger means mounted on said drive means for moving said die bolt actuating means to said bolt driving position.

4. The die set forth in claim 3 wherein said plunger means is movable in a to-and-fro path transverse to the to-and-fro path of said drive member; and said die bolt drive means includes solenoid means operatively associated with said plunger means for moving said plunger means to said bolt driving position.

5. The die as set forth in claim 2 wherein means, operatively associated with said actuating means, is provided for selectively transversely moving said actuating means between said removed position and said bolt driving position.

6. The die set forth in claim 1 wherein said die bolt means comprises a plurality of longitudinally spaced die bolts, rotatable about their respective axes, for moving longitudinally spaced portions of said one die lip toward and away from the other of said die lips; said die bolt drive means comprises a drive member movable in a to-and-fro longitudinal path of travel; said die bolt drive means including bolt actuating means mounted on said drive member for movement therewith and for movement relative thereto to selectively rotate any selected one of said die bolts.

7. The die set forth in claim 6 wherein said bolt actuating means comprises at least one pair of opposed pawls pivotably mounted on said drive member for movement therewith and for movement relative thereto between said removed position and said bolt driving position, and transversely movable means, mounted on said drive member, for selectively moving a selected one of said pawls from said removed position to said drive position.

8. The die set forth in claim 6 wherein said bolt actuating means includes a plurality of longitudinally spaced pairs of pawls mounted on said drive member for movement therewith and for movement relative thereto between remote positions and bolt driving positions; and transversely movable means, mounted on said drive member, actuable to move said pawls from said remote positions to said bolt driving positions, and means, mounted on said drive member, for selectively actuating any selected one of said transversely movable means to selectively move any selected one of said pawls.

9. A sheeting die comprising:
   a die body having a pair of opposed die lips defining an elongate die opening through which plastic and the like is extruded in sheet form, one of said die lips being movable toward and away from the other of said die lips to adjust the size of said opening;
   a plurality of longitudinally spaced rotatable members operatively associated with said one die lip for controlling the position of said one die lip relative to the other die lip; and
   means, operatively associated with said rotatable members, for adjusting the rotary positions of a plurality of rotatable members to adjust the size of said opening comprising:
   drive means movable in a to-and-fro longitudinal path of travel along said opening;

means mounted on said drive means, for movement therewith and relative thereto, for selectively rotating any selected one of said rotatable members as said drive means moves in said to-and-fro path of travel.

10. The die as set forth in claim 9 including means, operatively associated with said drive means, for reciprocally driving said drive means in said to-and-fro path of travel; said rotating means comprising:

actuating means on said drive means for movement therewith and for lateral movement relative thereto between a position removed from said rotatable members and a member driving position; and means for selectively moving said actuating means from said removed position to said member driving position.

11. The die as set forth in claim 10 wherein said actuating means comprises a plurality of longitudinally spaced actuators mounted on said drive means for movement therewith and for individual, lateral movement relative thereto between a removed position and a member driving position driving one of said rotatable members;

said means for selectively moving said actuating means including means for selectively actuating any selected one of said actuators.

12. In an extrusion die for continuously producing a sheet of material which has a substantial width relative to its thickness, said die including a die body having a pair of opposed die lips defining an elongate opening, one of said lips being movable toward and away from the other lip to control the size of said opening, means for continuously forcing material through said opening to form said sheet, a plurality of rotatable members spaced along said opening and operatively arranged with said one die lip to adjust the positons of spaced apart portions of said one die lip as said rotatable members rotate, the improvement comprising:

apparatus for adjusting the rotary positions of a selected one of said plurality of rotatable members to control the positions of selected portions of said die lip and the size of selected portions of said die opening comprising:

drive means, operatively associated with said rotatable members, movable in a to-and-fro path of travel along said opening;

a plurality of member actuating means mounted in spaced relation on said drive means for movement therewith and for movement relative thereto for selectively rotating on said drive means said rotatable members; and means on said drive means for selectively moving any selected one of said actuating means relative to said drive means to rotate any selected one of said rotatable members and control the position of a selected portion of said one die lip.

13. A sheet die comprising:

a die body, having a pair of longitudinally extending opposed die lips defining an elongate die opening through which plastic and the like is extruded in sheet form, one of said die lips being movable toward and away from the other of said die lips to adjust the size of said opening;

a plurality of longitudinally spaced rotatable members operatively associated with said one die lip for controlling the position of said one die lip relative to the other die lip; and means operatively associated with said rotatable members for adjusting the rotary positions of a plurality of rotatable members to adjust the size of said opening comprising:

drive means, movable adjacent said die body in a to-and-fro longitudinal path of travel along said opening;

means mounted on said drive means, for movement therewith and relative thereto, for selectively rotating any selected one of said rotatable members as said drive means moves in said to-and-fro path of travel.

14. The die as set forth in claim 13 including means for reciprocally driving said drive means in said to-and-fro path of travel; said rotating means comprising:

actuating means on said drive means for movement therewith and for lateral movement relative thereto between a position removed from said rotatable members and a member driving position; and means, operatively associated with said actuating means, for selectively moving said actuating means from said removed position to said member driving position.

15. The die as set forth in claim 14 wherein said actuating means comprises a plurality of longitudinally spaced actuators mounted on said drive means for movement therewith and for individual, lateral movement relative thereto between a removed position and a member driving position driving one of said rotatable members;

said means for selectively moving said actuating means including means for selectively actuating any selected one of said actuators.

16. Apparatus for adjusting the position of a die bolt which is rotatable about its axis, to control the size of a die opening comprising:

reciprocable drive means movable in a to-and-fro forward and reverse path of travel;

first lost motion connection means coupled to said drive means for selectively rotating such a bolt about its axis in one direction as said drive means moves in said forward path of travel; and second lost motion connection means coupled to said drive means for selectively rotating such a bolt about its axis in an opposite direction as said drive means moves in said forward path of travel;

said first and second lost motion connection means comprising first and second ratchet pawls mounted on said reciprocable drive means for movement between positions removed from said bolt means and positions driving said bolt means, and actuable means, mounted on said reciprocable drive means, for selectively moving either selected one of said first and second pawl means from said removed positions to such bolt driving positions.

17. The apparatus as set forth in claim 16 wherein said actuable means comprises reciprocable plunger means, mounted on said drive means and movable in said to-and-fro path, for moving said pawls between such removed positions and such bolt driving positions, and electrically driven solenoid means on said drive means for selectively moving said plunger means in said to-and-fro path.

18. The apparatus as set forth in claim 17 wherein said plunger means is movable in a to-and-fro path transverse to the to-and-fro path of said drive means.

19. The apparatus as set forth in claim 16 including means on said drive means yieldably biasing said pawls to such removed positions.

20. The apparatus as set forth in claim 16 wherein said first and second pawls are mounted on said drive means in confronting relation on opposite sides of such a bolt.

21. Apparatus for adjusting the rotary positions of a selected one of a plurality of longitudinally disposed rotatable die bolts operatively associated with a die lip to control the position of a die lip and the size of a die opening adjacent the die lip comprising:
- a frame;
- drive means movable on said frame in a to-and-fro longitudinal path of travel;
- a plurality of longitudinally disposed, bolt actuating means, mounted on said drive means for movement therewith and for movement relative thereto, for selectively rotating said bolts; and
- means on said drive means for selectively moving any selected one of said plurality of bolt actuating means relative to said drive means to rotate any selected one of said bolts;
- said bolt actuating means being mounted on said drive means for movement relative thereto between positions removed from such bolts and drive positions for rotatably driving such bolts;
- said means for selectively moving including means on said drive means for selectively moving any selected one of said plurality of bolt actuating means from said removed position to said drive position to rotate any selected one of such bolts;
- each of said longitudinally disposed bolt actuating means comprising first and second pawl members mounted on said drive means for movement in opposite directions between such removed positions and such drive positions; and
- means on said drive means for selectively driving said pawl members between such removed positions and such drive positions.

22. Apparatus for adjusting the rotary positions of a selected one of a plurality of longitudinally disposed rotatable die bolts operatively associated with a die lip to control the position of a die lip and the size of a die opening adjacent the die lip comprising:
- a frame;
- drive means movable on said frame in a to-and-fro longitudinal path of travel;
- a plurality of longitudinally disposed, bolt actuating means, mounted on said drive means for movement therewith and for movement relative thereto, for selectively rotating said bolts; and
- means on said drive means for selectively moving any selected one of said plurality of bolt actuating means relative to said drive means to rotate any selected one of said bolts;
- said bolt actuating means is mounted on said drive means for movement relative thereto between positions removed from such bolts and drive positions for rotatably driving such bolts; said means for selectively moving including means on said drive means for selectively moving any selected one of said plurality of bolt actuating means from said removed position to said drive position to rotate any selected one of such bolts; and
- means, operatively associated with said apparatus, for mounting said apparatus on such a die with a lost motion connection which permits relative expansion and contraction of such a die and said apparatus.

23. Apparatus for adjusting the rotary position of a plurality of longitudinally disposed, rotatable die bolts operatively associated with a longitudinally extending die lip to control the position of a die lip and the size of an elongate die opening comprising:
- a frame;
- a drive member mounted on said frame for reciprocable movement in a to-and-fro longitudinal path of travel;
- means operatively associated with said drive member for reciprocally driving said drive member in said to-and-fro path;
- bolt actuating means mounted on said drive member for movement therewith and for lateral movement relative thereto between a position removed from such bolts and a bolt driving position; and
- means operatively associated with said bolt actuating means, for selectively moving said bolt actuating means from said removed position to said bolt driving position to rotate any selected one of such bolts.

24. The apparatus as set forth in claim 23 wherein said means for moving said pawl means comprises plunger means movable in a to-and-fro path transverse to the to-and-fro path of said drive member and electrical energizable solenoid means operatively associated with said rotatable member for moving said plunger means in said to-and-fro path.

25. The apparatus as set forth in claim 23 wherein said moving means moves said bolt actuating means to such a drive position to rotate such a selected bolt as said drive member moves in said to-and-fro path of travel.

26. The apparatus as set forth in claim 25 wherein said bolt actuating means comprises pawl means movable on said drive member between said removed position and said bolt driving position and means on said drive member, operable in timed relation with movement of said drive member, for moving said pawl means to a position in which it engages one of such bolts as said drive member moves in said to-and-fro path of travel.

27. The apparatus as set forth in claim 25 wherein said bolt actuating means comprises a plurality of longitudinally spaced pairs of opposed pawls mounted on said drive member for selected movement toward and away from each other to drive any selected one of such bolts.

28. The apparatus as set forth in claim 23 wherein said means for selectively moving said bolt actuating means includes means yieldably biasing said bolt actuating means toward said removed position.

29. The apparatus as set forth in claim 23 wherein said bolt actuating means includes at least one pair of opposed bolt driving means mounted on said drive member for movement between said removed position and said bolt driving position; said means for moving said bolt actuating means including means mounted on said drive member for moving one of said bolt driving means to said bolt driving position when said drive member moves in one direction, and means mounted on said drive member for moving the other of said bolt driving means to said bolt driving position when said drive member moves in an opposite direction.

* * * * *

UNITED STATES PATENT OFFICE
CERTIFICATE OF CORRECTION

Patent No. 4,125,350     Dated November 14, 1978

Inventor(s) Gaylord William Brown

It is certified that error appears in the above-identified patent and that said Letters Patent are hereby corrected as shown below:

In column 1 on the page of the patent including the "Abstract" in lines 4 and 5, after "Sweetheart Plastics, Inc." delete -- Beaverton, Michigan -- and insert -- Guildware Park, Wilmington, MA 01887. --

Signed and Sealed this

Twentieth Day of March 1979

[SEAL]

Attest:

RUTH C. MASON
Attesting Officer

DONALD W. BANNER
Commissioner of Patents and Trademarks